United States Patent
Ahmadvand et al.

(10) Patent No.: US 6,754,411 B2
(45) Date of Patent: Jun. 22, 2004

(54) MACH-ZEHNDER BASED FILTER DEMULTIPLEXERS AND METHOD

(75) Inventors: Nima Ahmadvand, Ottawa (CA); Hamid Hatami-Hanza, Ottawa (CA)

(73) Assignee: Peleton Photonic Systems Inc., Ottawa (CA)

(*) Notice: Subject to any disclaimer, the term of this patent is extended or adjusted under 35 U.S.C. 154(b) by 40 days.

(21) Appl. No.: 09/809,847

(22) Filed: Mar. 16, 2001

(65) Prior Publication Data

US 2001/0024543 A1 Sep. 27, 2001

(30) Foreign Application Priority Data

Mar. 22, 2000 (CA) .............................................. 2302008

(51) Int. Cl.$^7$ .............................. G02B 6/28; H04J 14/02
(52) U.S. Cl. .............................. 385/24; 385/50; 398/82
(58) Field of Search .............................. 385/24, 48, 50; 398/79, 82, 83

(56) References Cited

U.S. PATENT DOCUMENTS

| | | | | |
|---|---|---|---|---|
| 5,590,226 A | * | 12/1996 | Wolf et al. | 385/132 |
| 5,611,007 A | * | 3/1997 | Wolf et al. | 385/11 |
| 5,852,505 A | * | 12/1998 | Li | 398/58 |
| 6,388,783 B1 | * | 5/2002 | Weller-Brophy | 398/82 |
| 6,487,335 B1 | * | 11/2002 | Yang et al. | 385/24 |
| 6,546,166 B1 | * | 4/2003 | Liu et al. | 385/24 |

* cited by examiner

*Primary Examiner*—Edward J. Glick
*Assistant Examiner*—Krystyna Suchecki

(57) ABSTRACT

WDM demultiplexers are provided utilizing, for example, cascaded asymmetric MZI filters, wherein the (asymmetric) differential delay is such that at the output of the first stage MZI demultiplexes the WDM channels in groups of two at its output. The result is a relaxed specification for the frequency response of the filters.

9 Claims, 7 Drawing Sheets

MACH-ZEHNDER BASED FILTER DEMULTIPLEXERS AND METHOD

FIELD OF THE INVENTION

The present invention relates to wave division multiplexing (WDM) and dense WDM (DWDM), and particularly to demultiplexers for WDM and DWDM multiplexed optical signals. More particularly still, it relates to demultiplexers utilizing cascaded asymmetric Mach-Zehnder Interferometers (MZI).

BACKGROUND OF THE INVENTION

WDM is the current favorite in optical communications. In this technology, data channels are multiplexed on different wavelengths. The number of available wavelength channels is growing rapidly as the technology improves. Currently, the International Telecommunication Union (ITU) specification is considering channel spacing as low as 50 GHz. This new generation of WDM is usually referred to as DWDM. On the other hand, data communication speeds have also increased significantly, so that OC-192 with around 10 Giga-bits per second is used in current optical network designs.

In WDM, devices are needed to multiplex and demultiplex different data channels. These devices are, however, very expensive and hard to manufacture. MZIs may be used as building blocks to build the optical multiplexer and demultiplexer. It should be noted that each of the input ports of the MZIs might be used. In the following descriptions, only one of the input ports, say input port 1, of the MZIs is used. It is also possible to use three-port combiner/splitter Y-junctions instead of four-port couplers in an MZI.

In a typical configuration, a number of MZIs are cascaded in a tree to separate all the WDM channels. For example, assume that there are 16 WDM channels ($\lambda_1, \ldots, \lambda_{16}$) to be demultiplexed. The first level MZI11 separates the odd and even channels into different output ports sent to MZI21 and MZI22, respectively. In the second stage, MZI21 and MZI22 redirect every other input to one of the outputs. For example, in the upper path, MZI21 redirects channels 1, 5, 9, 13 to MZI31, and channels 3, 7, 11, 15 to MZI32, and so on. In the final stage all the channels are demultiplexed to different output ports. In this scheme, the additional (or differential) delay required in one of the asymmetric MZI arms is half of the delay in the previous demultiplexing stage.

Methods are effective when the numbers of channels and the data rates are low. This is mainly because of the fact that MZI filtering characteristics change based on its differential delay or equivalently length difference of the two limbs of the MZI. The length difference ($\Delta l$) needed to separate channels with channel spacing can be calculated through $\Delta l \approx \lambda_0^2/(2\eta\Delta\lambda)$, where $\lambda_0$ is the central wavelength and $\eta$ is the refractive index of the waveguide (e.g. optical fiber). As an example, for 100 GHz spacing (wavelength spacing of 0.8 nm) and refractive index of 1.5, the length difference needed for the first stage filter (MZI11) is around 1001 micrometers. The length difference for the second stage filters (MZI21 and MZI22) is around 500.5 micrometers, 250.25 micrometers for the third stage MZI31, MZI32, MZI33, MZI34) and finally 125.12 micrometers for the last stage.

As technology moves towards higher data rates, such as the one for the OC-192 standard, the long delay caused by one of the limbs of the MZI might be comparable to the optical pulse width in the time domain. As a result, the MZI can cause dispersion or pulse widening of the data signals. Consequently, the MZI tree structure cannot be used.

It should be noted that this problem might also exist in other filtering techniques. For example, design of sharp filters is usually very difficult no matter what technique is used. The novel technique may be successfully applied to filters/demultiplexers utilizing other than MZIs.

SUMMARY OF THE INVENTION

In this invention, a technique is introduced which relaxes the requirement of having very sharp frequency response in the first stage of the tree structure as used at present. In the novel approach, the channels are separated in pairs rather than singly. As a result, the filter frequency response for the first stage need not to be as sharp as in the prior art. This means that the delay can be kept in the range that does not cause any deterioration of the high-speed signal in the time domain. The channels are separated in pairs in the first stage, i.e. channels (1,2), (5,6), (9,10), (13,14) in one port and (3,4), (7,8), (11,12), (15,16) in the adjacent port. The same filtering is used with a small shift in the frequency response to separate the channels in the pairs. This technique, however, causes some attenuation to the signal that may be compensated by amplification.

BRIEF DESCRIPTION OF THE DRAWINGS

Exemplary embodiments of the invention will now be further described with references to the drawings in which same reference numerals designate similar parts throughout the figures thereof, and wherein.

DETAILED DESCRIPTION OF THE PREFERRED EMBODIMENT

Figure 1:
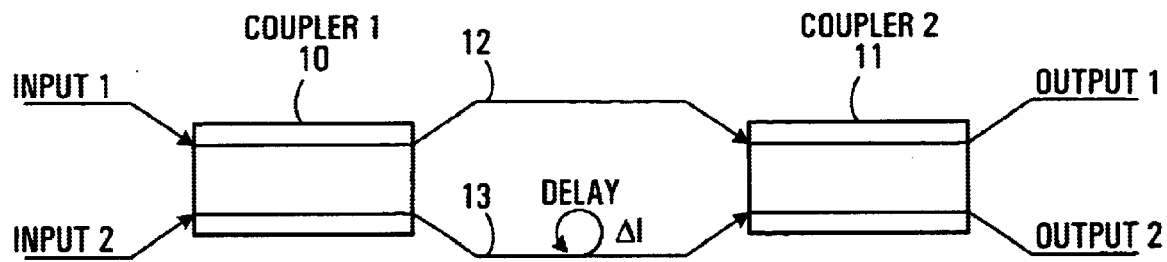
FIG. 1 shows an MZI having additional delay in one arm to provide wavelength filtering.
Figure 2:
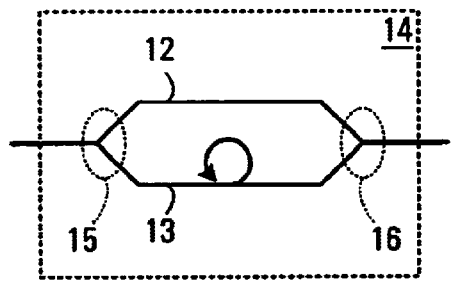
FIG. 2 shows MZI utilizing Y-junction couplers.
Figure 3:
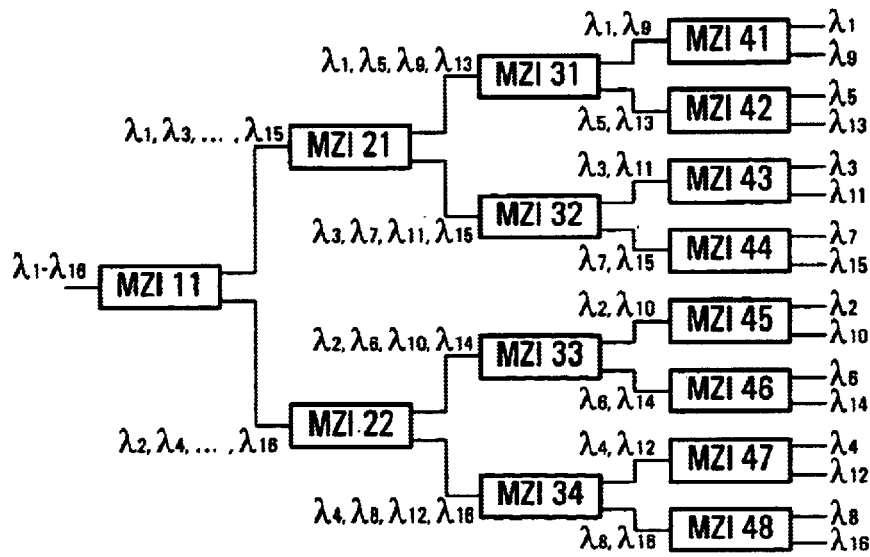
FIG. 3 shows cascaded MZIs to provide a wavelength demultiplexer according to the prior art.
Figure 4A:
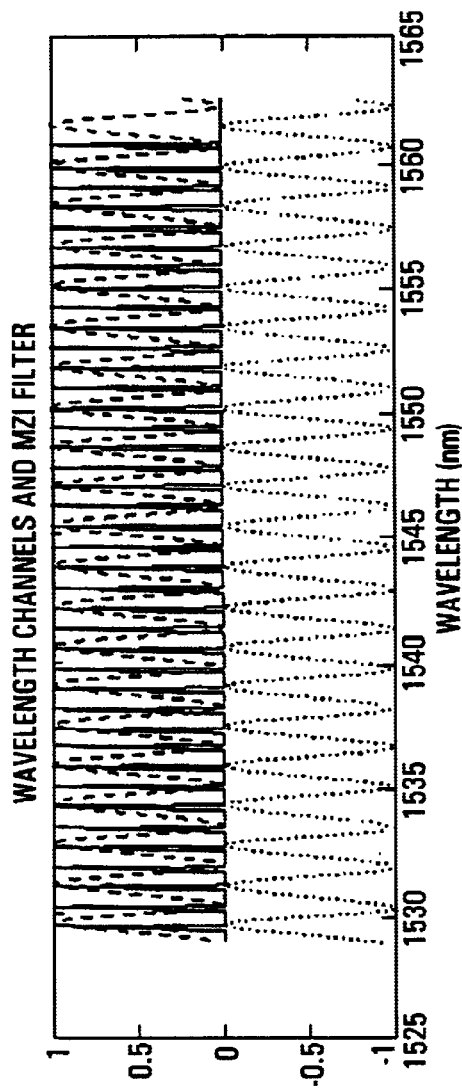
FIGS. 4a and 4b show the results of filtering after the first stage using the prior art demultiplexer of FIG. 3.
Figure 4B:
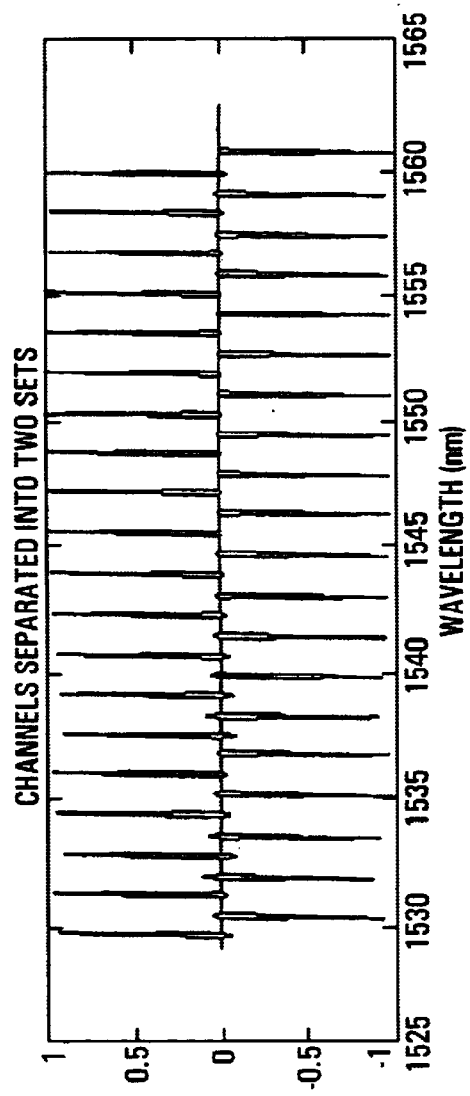
Figure 5:
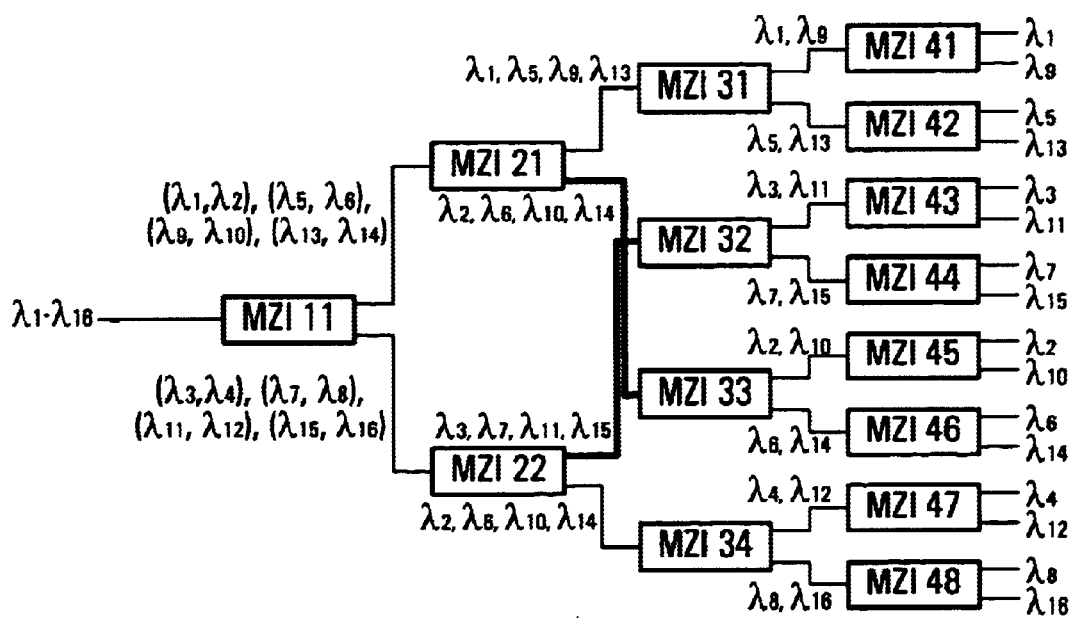
FIG. 5 shows a demultiplexer according to the present invention.
Figure 6A:
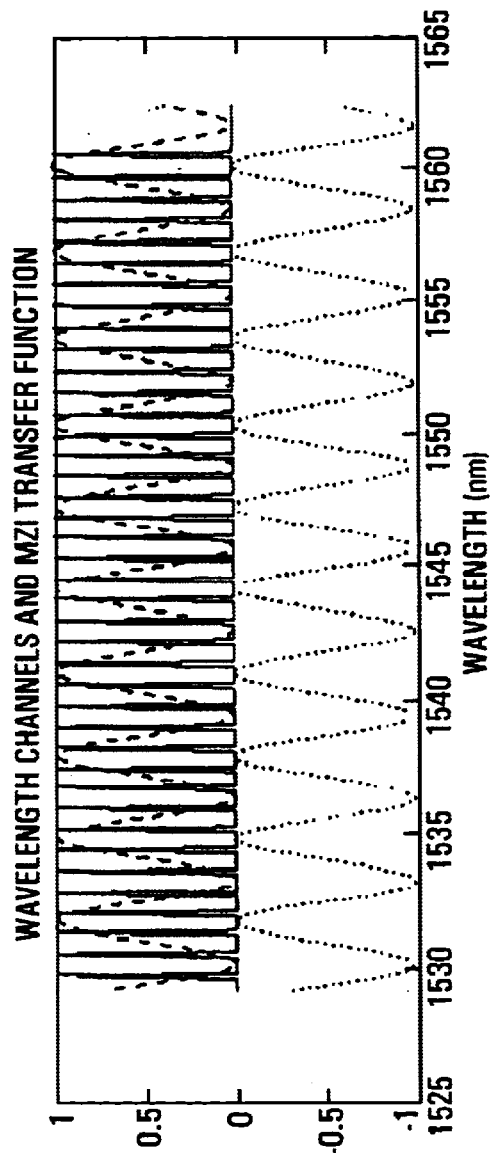
FIGS. 6a and 6b show the results of filtering after the first stage of the demultiplexer of FIG. 5.
Figure 6B:
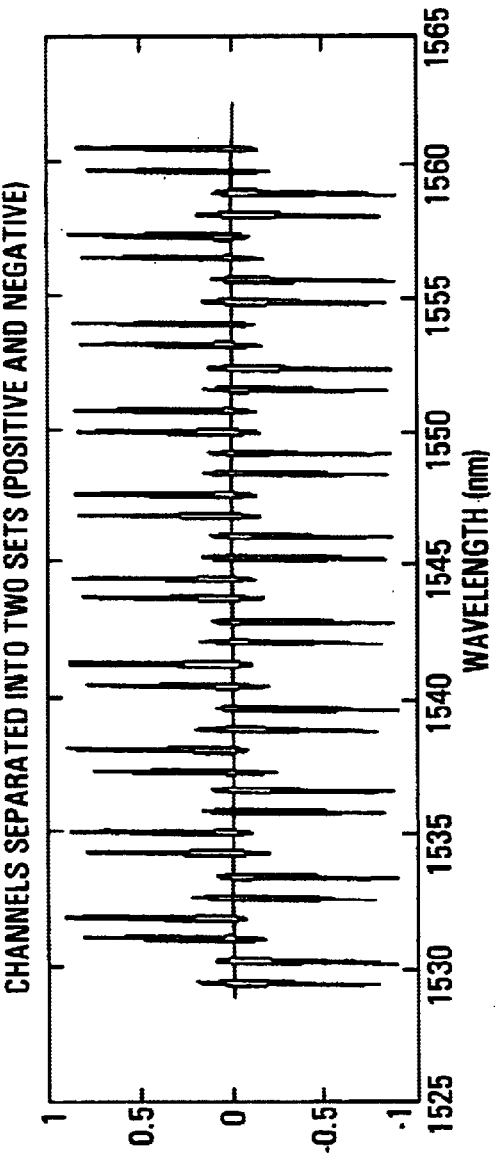

Referring to FIG. 1 of the drawings, it shows an MZI having a four-port input coupler 10 and an output four-poi coupler 11, and two branches (or arms) 12 and 13 interconnecting the couplers 10 and 11. The branch 13 provides slightly more delay $\Delta l$ than the branch 12. In FIG. 2, a similar MZI14 is shown, but using Y-junctions 15 and 16 as the input and output couplers. An asymmetric MZI is the building block of the cascaded demultiplexers both of the prior art and the present invention; the difference being in the asymmetric delay $\Delta l$, which causes the wavelengths in the WDM or DWDM input signal to be split in pairs or singly at the output of the first MZI in the cascade. This is shown in FIGS. 3 and 5, where in FIG. 3 the component lambdas at one output of MZI11 and even numbered lambdas at the other output of the MZI11. While in FIG. 5, according to the present invention, the two outputs of the MZI11 split the lambdas into pairs ($\lambda_1, \lambda_2$) to ($\lambda_{13}, \lambda14_2$) and ($\lambda_3, \lambda_4$) to ($\lambda_{15}, \lambda_{16}$) between them. This is shown in the transfer function is of the MZI11 of FIG. 3 in FIGS. 4a and 4b; and of the MZI11 of FIG. 5 in FIGS. 6a and 6b. This is achieved by the differential delay $\Delta l$ if the MZI11 in FIG. 5 being approximately one-half of the $\Delta l$ of the MZI11 in FIG. 3. With the further important characteristic that the delay in the next stages of the MZIs (that is MZI 21,22; MZI 31, 32, 33, 34; and MZI 41,42,43,44,45,46,47,48) are also reduced by one-half from their values in FIG. 3.

Figure 7A:
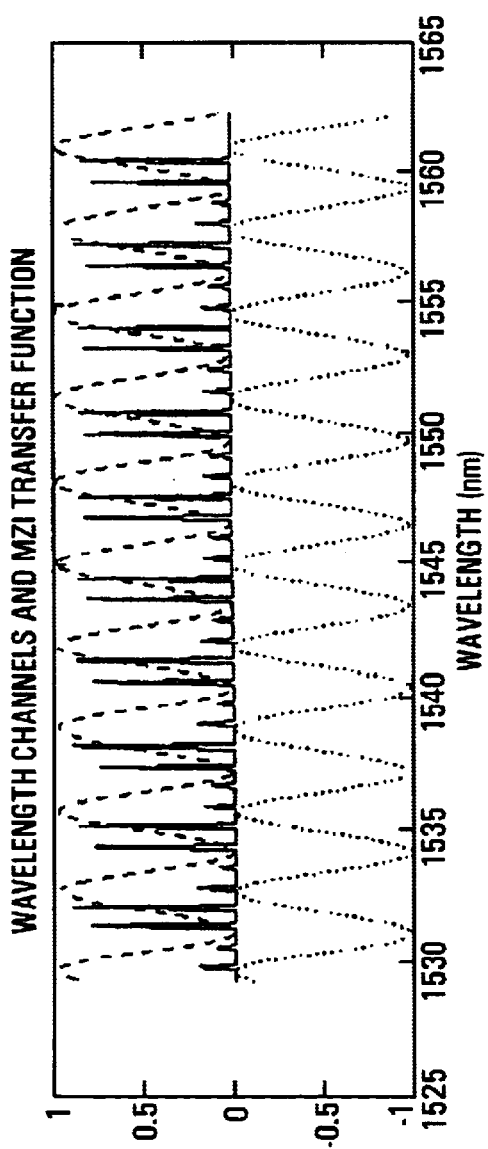
FIGS. 7a and 7b show the results of filtering after the second stage of the demultiplexer of FIG. 5.
Figure 7B:
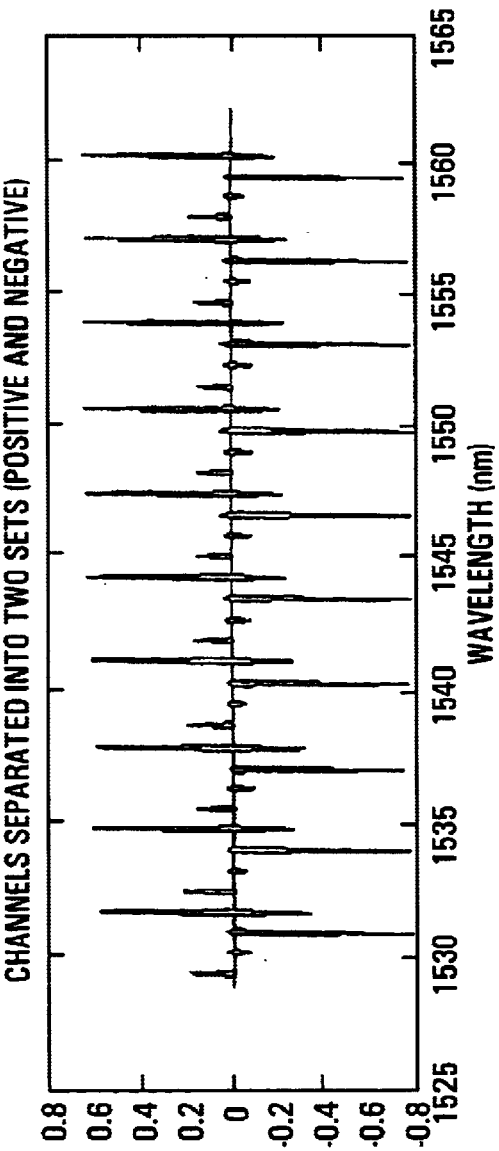
Figure 8A:
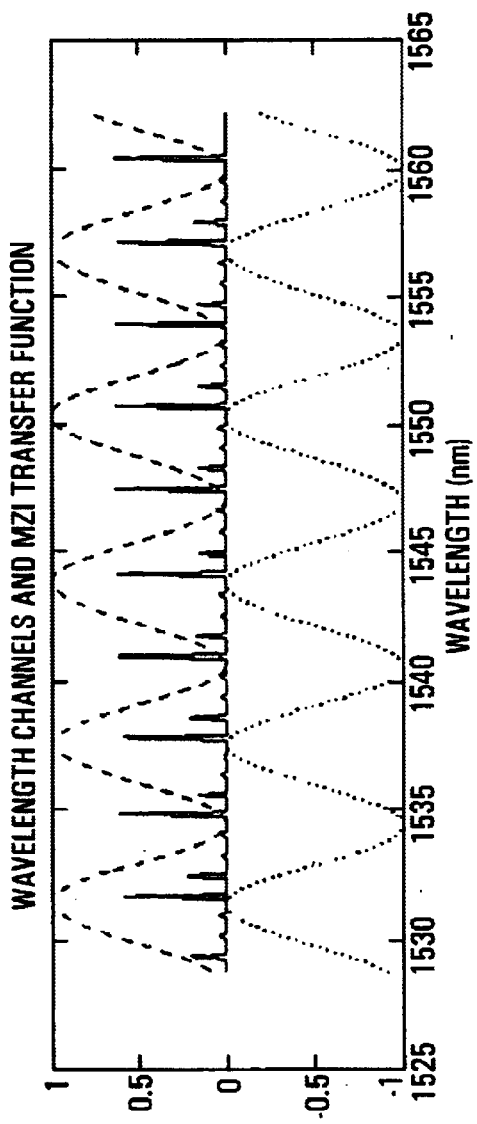
FIGS. 8a and 8b show the results of filtering after the third stage of the demultiplexer of FIG. 5.
Figure 8B:
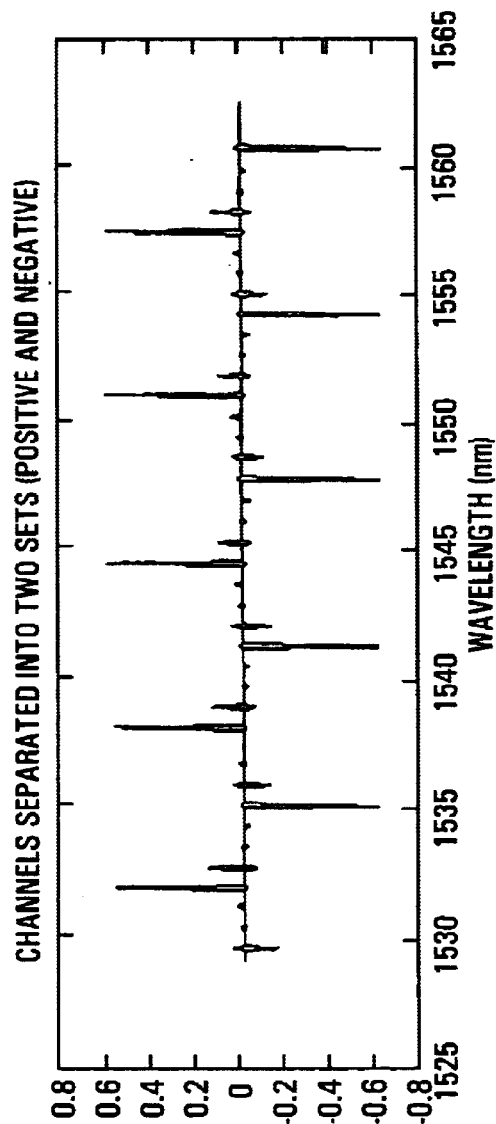

The transfer functions and channels at the outputs of the second and third stages of the demultiplexer of FIG. 5 are shown in FIGS. 7a, b and 8a and b, respectively.

FIGS. 4, 6, 7 and 8 show generally wavelength channels specified by ITU, with channel spacing of 100 GHz (0.8 nanometers). In FIG. 4, the sharp filtering required means a differential delay $\Delta l$ in MZI11 of approximately 1001 micrometers; this $\Delta l$ is reduced in the MZI11 of FIG. 5 to approximately 500 micrometers. This means that the passband of the first stage filter is as large as that of second stage filters in the prior art. The same filter is used for the second stage (MZI21 and MZI22) with a small shift in the frequency response. This frequency shift can easily be performed by a small change in the optical length difference of the MZI. In this case this value is in the range of 0.5 micrometers. The output for one of the second stage filters is shown in FIG. 7b. The attenuation caused by this method is also shown in output signals of the first and second stages. We should also note that a small cross-talk of adjacent channels exists. This cross-talk gradually decreases in each stage of the filtering.

As shown in FIG. 3, the third stage, and any stages after in accordance with the invention, are the same as those used in the prior art tree structure demultiplexing (shown in FIG. 3) with a small configuration of the connections as shown in FIG. 5. There, the two outputs from MZI21 and MZI22, going to the inputs of MZI32 and MZI33 in FIG. 3, are now interchanged. This is necessary due to the pairing of odd and even channels at the outputs of MZI11, which feed MZI21 and MZI22.

Figure 9A:
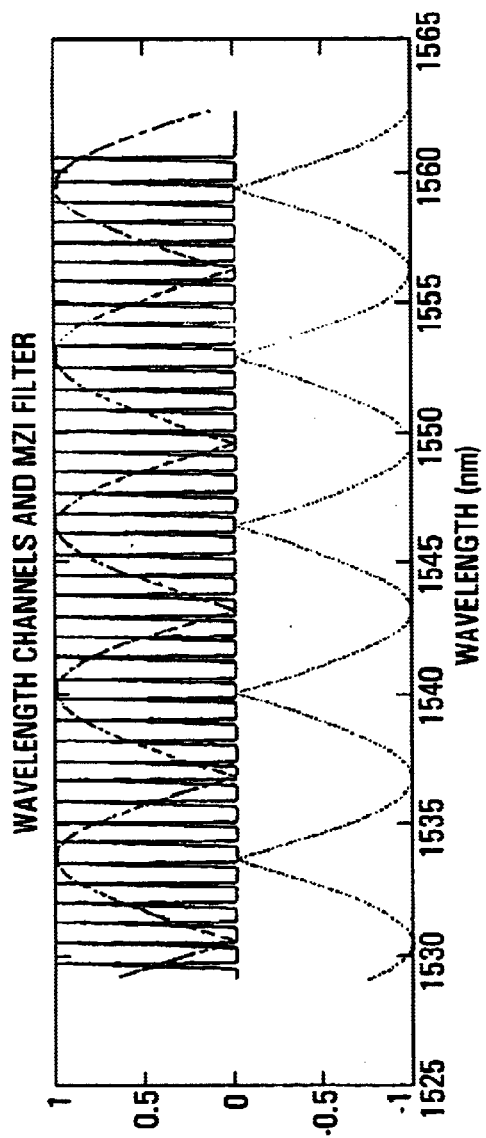
FIGS. 9a and 9b show filtering results after the first stage of an alternative demultiplexer to that shown in FIG. 5, wherein the first stage divides the wavelength channels in groups of four, instead of two, at its output.
Figure 9B:
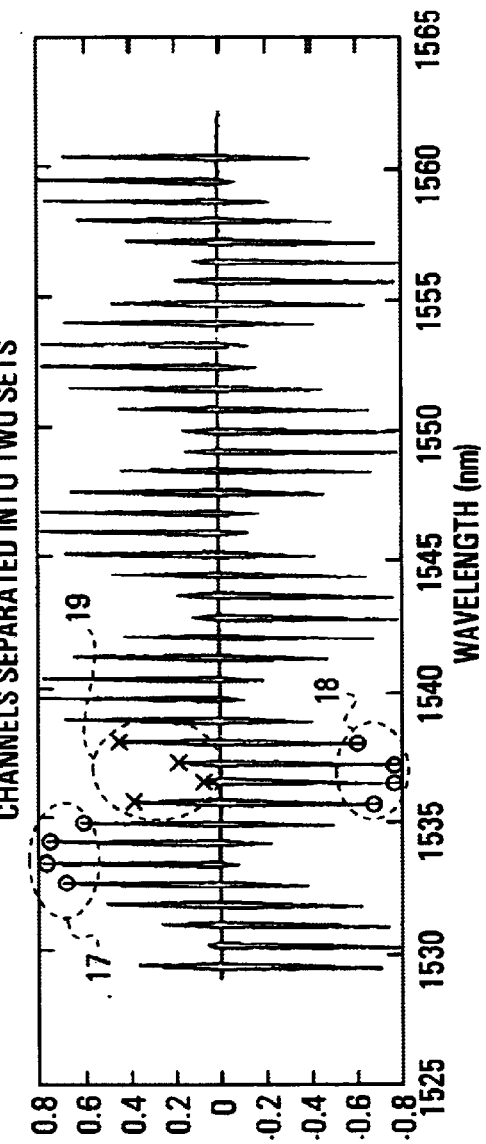

In the above description in was shown how pair filtering could help to relax the filtering requirements at the fist stage. However, it is reasonable to ask what would be the result if the channels were divided in groups of four, eight or more. Although, the present scheme is still applicable, the resulting cross talk and filter distortion may not be acceptable. An example is shown in FIGS. 9a and 9b for a 4-by-4 case. As shown, the middle pairs in each block (17 and 18 in FIG. 9b) of 4 channels have higher energy than the other two. The cross talk effect at the other outputs (19 in FIG. 9b) is also noticeable. We should also note that it is not easy to separate the channels in each block in the second stage as was done in the paired case.

What is claimed is:

1. A method for demultiplexing a WDM optical channel signal containing a sequence of WDM channels, characterized by separating the WDM channels into output signals, each output signal containing a respective plurality of groups of consecutive adjacent WDM channels in said sequence of WDM channels prior to further demultiplexing, each of said groups in one of said output signals being spaced from another of said groups in the one output signal at least by channels in a group of channels in another of said output signals.

2. The method of claim 1, wherein said demultiplexing is performed by means of cascaded filtering stages.

3. The method of claim 2, wherein said filtering stages comprise asymmetric Mach-Zohnder interferometers (MZIs).

4. A demultiplexer for demultiplexing a WDM optical channel, signal containing a sequence of WDM channels, comprising a plurality of cascaded wavelength filters, wherein a first stage of the cascaded filters separates the WDM channel into two output signals, each output signal containing a respective plurality of pairs of consecutive adjacent WDM channels in said sequence of WDM channel, each of said pairs in one of said output signals being spaced from another of said pairs in the one output signal at least by channels in a pair of channels in the other of said output signals.

5. The demultiplexer of claim 4, wherein paid first stage is an asymmetric Mach-Zehnder Interferometer (MZI) having a differential delay in one of its two arms, said differential delay being predetermined to provide said pairs of consecutive adjacent WDM channels in said output signals.

6. The demultiplexer of claim 5 wherein a first of said two first stage output signals contains a first pair of lowest wavelength channels and contains every second pair of channels thereafter, a second of said two first stage output signals contains a pair of channels immediately following said first pair and every second pair of channels thereafter.

7. The demultiplexer of claim 5 wherein the first stage of cascaded filters comprises cascaded filters having a passband width as large as a passband width of cascaded filters in a second stage of cascaded filters.

8. A method for demultiplexing a WDM optical channel signal containing a sequence of WDM channels each having a respective wavelength, the method comprising:

performing a first stage of demultiplexing to produce two first stage output signals, each first stage output signal containing a plurality of pairs of consecutive adjacent WDM channels in said sequence of WDM channels, each of said pairs in one of said first stage output signals being spaced from another of said pairs in the one first stage output signal at least by channels in a pair of channels in the other of said first stage output signals;

performing at least one subsequent stage of demultiplexing to extract individual channels.

9. A method according to claim 8 wherein a first of said two first stage output signals contains a first pair of lowest wavelength channels and contains every second pair of channels thereafter;

a second of said two first stage output signals contains a pair of channels immediately following said first pair and every second pair of channels thereafter.

* * * * *